Dec. 27, 1938.  G. F. REZNOR  2,141,844
SIGNALING DEVICE
Filed Dec. 29, 1933
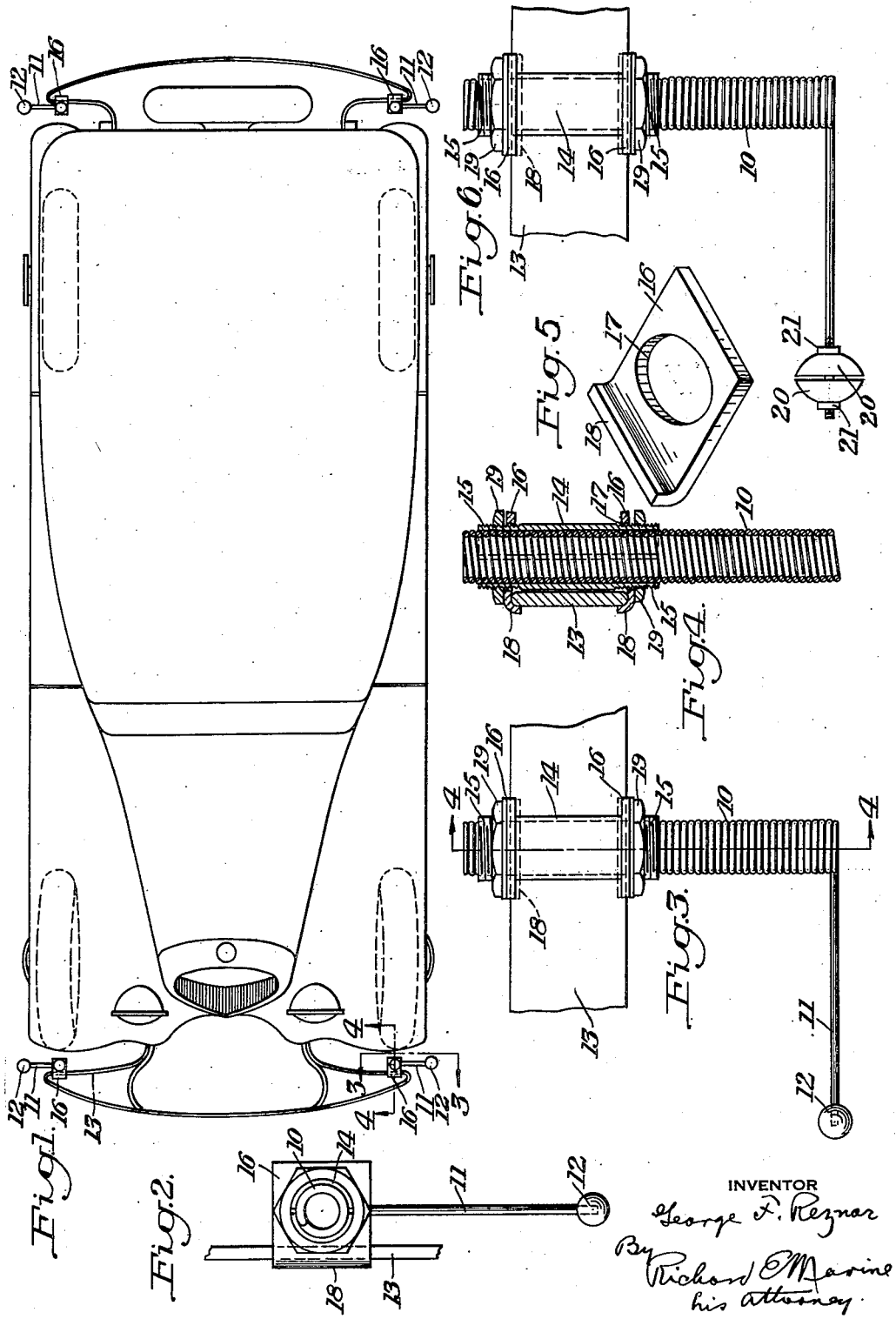
INVENTOR
George F. Reznor
By Richard E Marine
his attorney.

Patented Dec. 27, 1938

2,141,844

UNITED STATES PATENT OFFICE 2,141,844

SIGNALING DEVICE

George Foster Reznor, Mercer, Pa.

Application December 29, 1933, Serial No. 704,454

9 Claims. (Cl. 116—28)

My invention relates generally to signaling devices, and more particularly to devices adapted to signal the approach to an object whose position it is desired to determine.

My invention may be conveniently applied, for instance, to vehicles to determine the proximity of their parts to extraneous objects, for example, in the case of air and land vehicles, to the ground, or, in the case of a boat, to a pier.

As herein illustrated, my invention is shown applied to an automobile to give an audible warning of the approach to a curb, one such device preferably being located at each corner of the car. The driver is thus enabled to park his car within the required distance from the curb without injuring the tires or hub caps by scraping them thereagainst. In a similar manner my invention may be employed to indicate the lack of a safe clearance of the under part of the car above the roadway.

To these ends my invention contemplates the provision of a self-contained signaling device extending from the vehicle which may conveniently take the form of a vibratory member adapted to give forth audible sounds when engaged by the object whose proximity it is desired to indicate. More specifically my vibratory system may advantageously take the form of a coiled spring adapted to be attached to a vehicle, and provided at its free end with a rod or reed-like extension adapted to be set in vibration by engagement with the object whose propinquity is to be indicated. The outer end of the rod or reed extension may be further provided with an extended or ball-like surface for engaging the object, or a bell for amplifying the sound.

Other novel features and advantages of my invention will hereinafter appear.

In the accompanying drawing showing for purposes of exemplification but without limiting my invention or claims thereto, certain practical embodiments of the principles of my invention:

Fig. 1 is a plan view of an automobile showing one form of my curb warning device applied thereto.

Fig. 2 is an enlarged top plan view of one of said devices.

Fig. 3 is an enlarged side elevation of the same on the line 3—3 of Fig. 1.

Fig. 4 is a section of said device taken on the line 4—4 of Figs. 1 and 3.

Fig. 5 is a perspective view showing one of the clamping members of said device, and Fig. 6 is a side elevation of a modified form of said device.

Referring to the drawing, there is shown a coiled spring 10, having one of its ends extended to form an integral flexible reed-like arm 11, adapted to be set in sound-producing vibration by engagement of its free end with an obstruction, such as a curb, and serving by its own flexibility and that of the coiled spring 10 to prevent injury to the device. The arm 11 may of course be separate from but rigidly attached to the spring 10.

The free end of the arm 11 may be advantageously provided with an extended bearing surface such as that of a hardened steel ball 12, to impart the desired frequency to the vibratory system, to reduce the wear on the arm, to prevent its being caught in indentations in the curb, to make it more easily observed and to prevent injury to anyone coming into contact therewith. If desired the ball may be made of semi-hard rubber.

The upper end of the coiled spring 10 is preferably rigidly attached in any suitable manner to a fixed part of the vehicle, such as the side of a fender or the rear member of a bumper 13. The free end of the arm is positioned to extend slightly beyond the outer line of the fenders and hub caps and sufficiently low to engage the curb.

The attachment of the coiled spring 10 to the bumper 13 may be conveniently effected through the instrumentality of a split tubular member or casing 14, externally threaded at both ends 15, and adapted to receive the upper end of the spring, which is slidably adjustable therein to the desired height. The casing 14 is adjustable along the bumper 13 to give the desired extension of the arm 11, horizontally, beyond the side of the car and in its adjusted position is firmly clamped to the bumper by the plates 16 provided with holes 17, through which the casing 14 passes, and upturned ends 18 to embrace the bumper 13. The clamping plates are forced into firm clamping engagement with the bumper, and simultaneously the split tubular parts of the casing are forced into clamping engagement with the coiled spring 10, by nuts 19 screwed on the threaded ends 15 of the casing.

In Fig. 6 I have shown a modification in which a pair of opposed semi-spherical bell members 20, preferably loosely mounted on the arm 11 by retaining nuts 21, are employed, the bell members being caused to ring by vibration of the arm when the curb is engaged. If desired the ball 12 may be retained at the extreme end of the arm.

While I have illustrated and described the best forms of my invention now known to me, it will be understood that changes may be made in the forms disclosed, without departing from the spirit of my invention, and that certain features may sometimes be used to advantage without a corresponding use of other features.

I claim:—

1. An obstruction detecting device for vehicles comprising a coiled spring adapted to be attached, near one of its ends, vertically to a vehicle and having an arm rigidly connected to its free end and extending horizontally beyond said vehicle to cause the device to vibrate and thereby give a warning sound when said arm engages an obstruction.

2. A signaling device for vehicles comprising a vibratory signaling member adapted to be attached at one of its ends to a vehicle and provided at its free end with an extended surface for engagement with extraneous objects, whereby said member is set in vibration to give a warning sound.

3. A signaling device for vehicles comprising a vibratory signaling member adapted to be attached at one of its ends to a vehicle and provided at its free end with a substantially spherical member, said vibratory member being adapted to be set in vibration by engagement of its spherical member with an extraneous object.

4. An obstruction detecting device for vehicles comprising a coiled spring having one end designed for attachment to a vehicle and having rigidly connected thereto at its other end a resilient member having a free end which, when said device is mounted on a vehicle, is located beyond the normal boundaries of the vehicle so that said free end will engage an extraneous object in propinquity to the vehicle and thereby set said resilient member in vibration to cause it to give forth a warning sound.

5. An obstruction detecting device for vehicles comprising a resilient vibratory signaling member having an end portion designed for attachment to a vehicle, a resilient spring portion intermediate its ends, and an obstacle-engaging portion at its free end which obstacle-engaging portion, when said device is mounted on a vehicle, will be located beyond the normal boundaries of the vehicle so that it will engage an extraneous object in propinquity to the vehicle and thereby set said resilient spring portion in vibration to cause it to generate a warning sound.

6. The combination with a motor vehicle, of a device movably mounted thereon and adapted to engage a curbstone or the like upon mere close approach of the vehicle to such curbstone, and means for indicating such engagement to the driver.

7. The combination with a motor vehicle, of a curbstone indicator comprising a device mounted on the side of the vehicle and having a portion projecting beyond the side of the vehicle in a position to engage a curbstone or the like as the vehicle closely approaches the latter, and means for indicating to a driver on the driver's seat the fact of said engagement.

8. The combination with a motor vehicle, of a device movably mounted thereon, said device having a portion adapted to engage a curbstone or the like upon mere close approach of the vehicle to such curbstone, and a portion for signaling such engagement to the driver.

9. The combination in an obstacle signaling device for a vehicle, comprising a resilient rod adapted to be mounted on said vehicle, the rod having a portion located in a normal position to engage a curbstone or the like when the vehicle approaches closely enough thereto, and another portion for signaling such engagement to the driver.

GEORGE FOSTER REZNOR.